Aug. 15, 1950 W. E. SUTTER ET AL 2,519,083

TIME DIVISION PULSE MULTIPLEX SYSTEM

Filed Aug. 8, 1949 6 Sheets-Sheet 1

Inventors:
Walter E. Sutter,
Thomas G. Custin,
by Merton D. Moore
Their Attorney.

Aug. 15, 1950 W. E. SUTTER ET AL 2,519,083
TIME DIVISION PULSE MULTIPLEX SYSTEM
Filed Aug. 8, 1949 6 Sheets-Sheet 2

Inventors:
Walter E. Sutter,
Thomas G. Custin,
by Merton D. Moore
Their Attorney.

Aug. 15, 1950 W. E. SUTTER ET AL 2,519,083

TIME DIVISION PULSE MULTIPLEX SYSTEM

Filed Aug. 8, 1949 6 Sheets-Sheet 3

Inventors:
Walter E. Sutter,
Thomas G. Custin,
by Merton D. Moore
Their Attorney.

Aug. 15, 1950 W. E. SUTTER ET AL 2,519,083

TIME DIVISION PULSE MULTIPLEX SYSTEM

Filed Aug. 8, 1949 6 Sheets-Sheet 4

Inventors:
Walter E. Sutter,
Thomas G. Custin,
by Merton D. Morse
Their Attorney.

Aug. 15, 1950 W. E. SUTTER ET AL 2,519,083

TIME DIVISION PULSE MULTIPLEX SYSTEM

Filed Aug. 8, 1949 6 Sheets-Sheet 5

Inventors:
Walter E. Sutter,
Thomas G. Custin,
by Merton D. Moore
Their Attorney.

Aug. 15, 1950 W. E. SUTTER ET AL 2,519,083

TIME DIVISION PULSE MULTIPLEX SYSTEM

Filed Aug. 8, 1949 6 Sheets-Sheet 6

Inventors:
Walter E. Sutter,
Thomas G. Custin,
by Milton D. Moore
Their Attorney.

Patented Aug. 15, 1950 2,519,083

UNITED STATES PATENT OFFICE 2,519,083

TIME DIVISION PULSE MULTIPLEX SYSTEM

Walter E. Sutter, Syracuse, and Thomas G. Custin, Baldwinsville, N. Y., assignors to General Electric Company, a corporation of New York Application August 8, 1949, Serial No. 109,220

21 Claims. (Cl. 179—15)

Our invention relates to a communication system of the type in which a plurality of intelligence-bearing signals are simultaneously transmitted over a single communication channel by means of recurring trains of pulses which are interleaved in time. Such a system is generally known to the art as a time division pulse multiplex system.

In a system of this type, each of the signals to be transmitted is recurrently sampled at a relatively high rate by one of a group of channel pulses which follow each other consecutively after a master synchronizing pulse. The groups of synchronizing pulses and associated time-displaced channel pulses have a common repetition frequency which is higher than the higest frequency component which it is desired to transmit in any one of the signals. The intelligence may be conveyed by modulating the transmitted channel pulses in various known ways. For example, each of the pulses may be modulated in amplitude, time position, length or frequency in accordance with the instantaneous value of the modulating signal. Our invention has particular utility in its application to a pulse multiplex system employing pulse length modulation of the channel pulses. In the receiving equipment, corresponding groups of synchronizing pulses and channel pulses are utilized to separate out the components of the composite signal, which are then supplied to separate signal channels.

As is well known to those skilled in the art, such a system requires a high degree of stability and accurate synchronization, particularly where high quality audio or video signals are to be transmitted on one or more of the multiplex channels. It is necessary that each of the trains of synchronizing and channel pulses at the receiver be very precisely synchronized with the corresponding pulses at the transmitter to avoid degradation of the signal, as well as to minimize interference and cross-modulation between channels.

Our invention has for a principal object the provision of an improved pulse multiplex system in which all of the synchronizing and channel pulses in both transmitter and receiver are directly controlled from a master synchronizing generator in the transmitter.

More specifically, it is an object of our invention to provide an improved time division pulse multiplex system in which each of the channel pulses in the receiver is individually and directly synchronized with the corresponding channel pulse in the transmitter.

It is therefore a general object of our invention to provide improved synchronizing and channel selection circuits for a time division pulse multiplex system.

Another general object of our invention is to provide an improved time division pulse multiplex system which permits a relatively large number of signals to be multiplexed on a single communication channel without interference or cross-talk and which provides high quality reproduction of the transmitted signals.

For additional objects and advantages, and for a better understanding of our invention, attention is now directed to the following description and accompanying drawings. The features of our invention believed to be novel are particularly pointed out in the appended claims.

In the drawings.

In the several figures of the drawings, corresponding elements have been designated by corresponding reference numerals to facilitate comparison.

Figure 1:
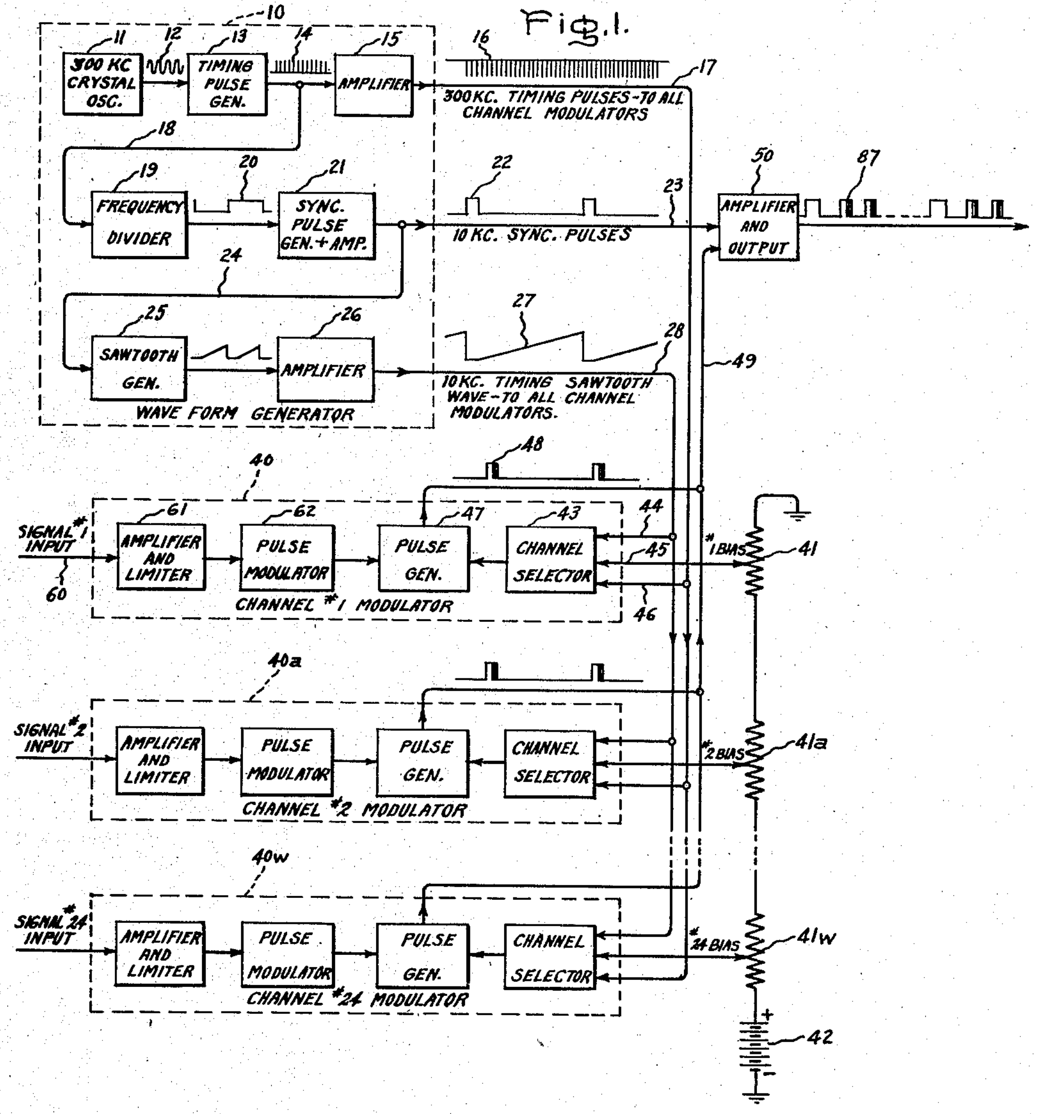
Fig. 1 is a simplified schematic block diagram of a 24-channel pulse multiplex transmitter terminal system embodying our invention.

The master synchronizing control unit for the entire system is the waveform generator 10 shown in the upper portion of the transmitting station of Fig. 1. Since the individual components of this generator may comprise conventional circuits, its components are indicated only schematically in simplified block form. All of the timing and synchronizing waves utilized in the system are derived, for example, from a 300-kc.

oscillator 11, which may be crystal controlled. The output sine wave 12 is supplied to a timing pulse generator 13 which operates in well-known manner to convert the sine wave into a train of sharp unidirectional timing pulses 14, also recurring at a 300-kc. rate. These pulses are amplified and inverted in amplifier 15 and the resultant negative timing pulses 16 are supplied to an output conductor 17, for purposes shortly to be described.

The timing pulses 14 are also supplied over conductor 18 to synchronize a frequency divider 19 at a frequency which is a submultiple of the 300-kc. frequency of the timing pulses. In the illustrated form of the invention, which provides for 24 separate signal channels, the output of frequency divider 19 is a rectangular wave 20 having a 10-kc. repetition rate. These pulses are in turn utilized to control the operation of a synchronizing pulse generator and amplifier whose rectangular output pulses are of the form represented by wave 22 adjacent the output conductor 23.

The synchronizing pulses 22 are also supplied over a conductor 24 to control a 10-kc. sawtooth wave generator 25. After suitable amplification in amplifier 26, the resultant 10-kc. sawtooth waves 27 are supplied to an output conductor 28.

Figure 6:
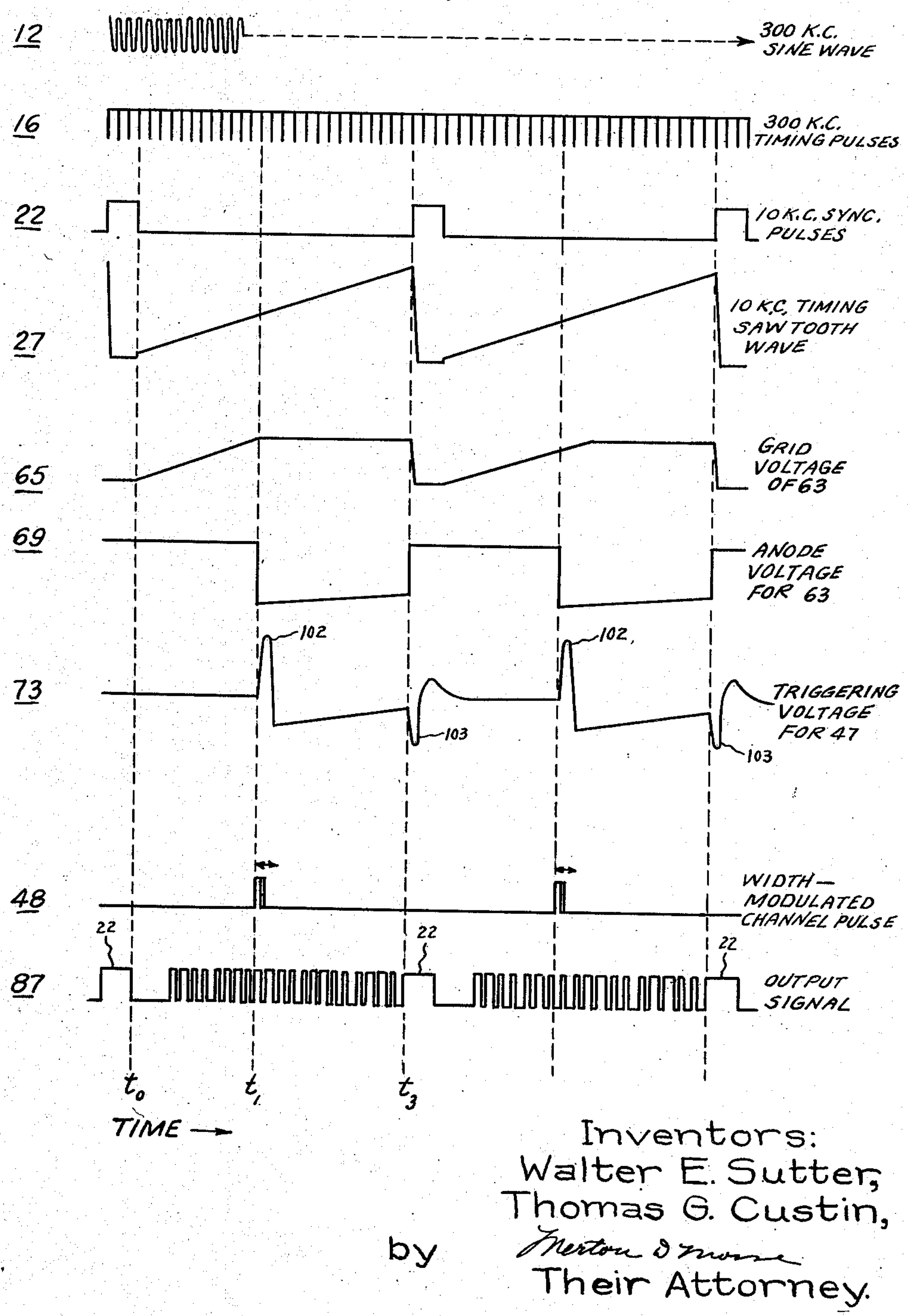
Fig. 6 is a group of curves, on a common time scale, illustrating the waveforms of voltages and currents at various points in the transmitter.

It will thus be seen that the wave form generator 10 provides three output waves 16, 22 and 27. As is best shown in the curves of Fig. 6, all of these waves are accurately synchronized with the common 300-kc. sine wave 12. Two of these waves, the 300-kc. timing pulse wave 16 and the 10-kc. timing sawtooth wave 27, are supplied to all of the channel modulators in parallel, where they are utilized to produce the 24 accurately positioned trains of channel pulses which are interleaved in time division relation in the transmitted signal. Since the circuits of each of the channel modulators may be identical, only three modulators 40, 40*a* and 40*w* are represented in Fig. 1, corresponding to the modulators for channel No. 1, channel No. 2 and channel No. 24, respectively.

Each of the channel modulators has the function of producing a train of narrow rectangular pulses which are modulated in accordance with the signal intelligence to be transmitted on one of the channels. In the illustrated form of the invention the modulation is conveyed by means of pulse width, or pulse length, modulation. All of the 24 trains of channel pulses recur at the same 10-kc. repetition rate, but they are successively displaced in time position, or time phase, with respect to the common synchronizing pulses. It will be noted that each of the channel modulators 40, 40*a*—40*w* is provided with a different value of adjustable bias potential from a corresponding potentiometer section 41, 41*a*—41*w*. All these sections are energized from a common bias source, represented conventionally by a battery 42. Thus, a different bias potential is supplied to each of the channel modulators. This bias potential, in conjunction with the timing pulses 16 and the sawtooth wave 27, provides very precise timing of each channel pulse train in a manner now to be described.

In the channel modulator 40, for example, the control voltages and waves are applied to a channel selector 43, the timing sawtooth wave 27 being supplied over conductor 44, the bias voltage being supplied over conductor 45, and the timing pulses 16 being supplied over conductor 46. Channel selector 43 provides a train of selector pulses whose time position is conjointly controlled by these three input signals so as to occur at a definite time position with respect to the synchronizing pulses. These selector pulses are supplied to trigger a pulse generator 47 which generates the resultant output channel pulses 48. The channel pulses from each of the 24 modulators are supplied over a common conductor 49 to a final power amplifier 50 where they are combined with the synchronizing pulses supplied over conductor 23 to form the composite output wave 87.

In order to modulate each train of channel pulses 48 with desired intelligence, an input signal is supplied over conductor 60 through a suitable amplifier and limiter 61 to a pulse modulator 62. The output of the modulator 62 is utilized to control the length of the pulses generated by pulse generator 47 in the manner which will be better understood by reference to the detailed circuit diagram of the channel modulator shown in Fig. 2 which will now be described.

Figure 2:
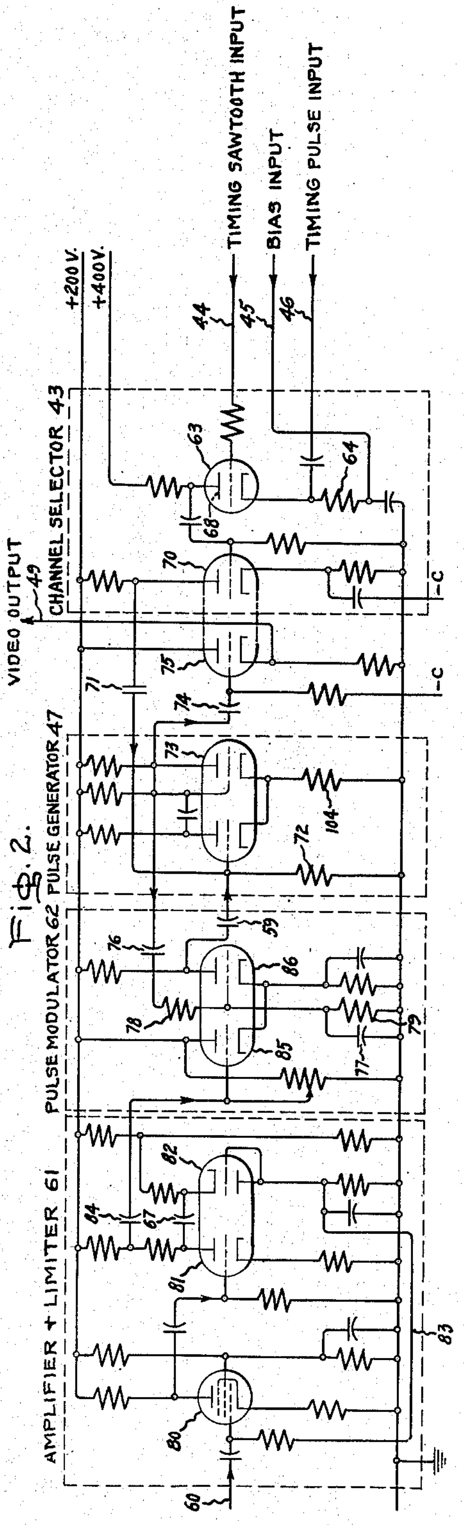
Fig. 2 is a detailed circuit diagram of one of the channel modulators of the transmitter of Fig. 1.

The channel selector 43 in Fig. 2 is more particularly described and claimed in our copending application Serial No. 109,221 filed August 8, 1949, and assigned to the same assignee as the present invention. Briefly, it comprises a triode amplifier 63 having the saw-tooth wave 27 applied to its control grid over conductor 44, the bias potential from potentiometer 41 applied to the lower end of a cathode resistor 64 over conductor 45, and the timing pulses 16 applied to its cathode over conductor 46. The amplifier is normally biased beyond cutoff by a positive bias voltage applied to its cathode through resistor 64. This bias voltage is gradually overcome by the rising positive portion of the timing sawtooth wave applied to its grid, in conjunction with the negative timing pulses applied to its cathode. The sawtooth wave provides an approximate point of time at which the tube will start to conduct, but this point is very accurately determined by the occurrence of the first timing pulse which, when added to the sawtooth wave, raises the grid voltage momentarily above cutoff. As is best shown by the waveforms in Fig. 6, the grid voltage of the amplifier 63 rises linearly along curve 65, from instant of time $t_0$, after each synchronizing pulse 22 until at instant of time $t_1$ the combined effect of the timing sawtooth wave and one of the timing pulses initiates conduction. The grid voltage 65 is thereafter limited by the flow of grid current until instant of time $t_3$ at which the sawtooth wave returns to a value below cutoff and the cycle repeats itself.

The sudden conduction of amplifier 63, which is preferably of the sharp cutoff type, produces a sudden drop in voltage at its anode 68, as illustrated by wave 69 in Fig. 6. The rectangular pulse wave 69 is amplified in a triode 70 and differentiated by means of a short-time-constant network comprising capacitor 71 and resistor 72 in its anode circuit, in order to produce a triggering voltage of the form represented by curve 73 in Fig. 6. The positive peaks 102 are effective to trigger pulse generator 47, but the negative peaks 103 have no effect due to the negative bias developed across a cathode resistor 104 in pulse generator 47.

The pulse generator 47 is conventionally represented in Fig. 2 as a single-pulse generator of the cathode-coupled type including a double triode 73 whose output is supplied through a coupling capacitor 74 to a cathode follower stage 75, and thence to the common output conductor 49.

The input signals to be transmitted are supplied over conductor 60 to the amplifier and limiter 61, which includes two amplifier stages 80 and 81. The full output of the second amplifier 81 is applied to a diode detector 82 through coupling capacitor 67. Detector 82 develops an automatic gain control voltage which is fed back to the input of the first stage 80 over conductor 83 in order to limit the input signal amplitude to a value which the pulse modulator and pulse generator can accept without distortion. A suitable fraction of the output voltage of the amplifier 81 is also supplied through a coupling capacitor 84 to the input of the pulse modulator 62, which also includes two stages 85 and 86.

The pulse modulator and pulse generator are more particularly described and claimed in the copending application of Thomas G. Custin, Serial No. 78,608, filed February 26, 1949, now Patent 2,492,736, issued Dec. 27, 1949 and assigned to the same assignee as the present invention. Therefore, their construction will not be described in detail herein. Very briefly, each of the input trigger pulses supplied to pulse generator 47 through coupling capacitor 71 determines the instant of time at which each of the output channel pulses of pulse generator 47 is initiated. When this occurs, a pulse is also supplied through a coupling capacitor 73 to the control grid of stage 86 of the pulse modulator. This pulse is integrated by a network comprising capacitors 76 and 77 and resistors 78 and 79. Stage 86 is normally maintained cut off by a cathode bias voltage which is in turn controlled by current through stage 85 of the modulator. At a predetermined instant of time, stage 86 begins to conduct and a sharp terminating pulse is impressed on pulse generator 47 through coupling capacitor 59, restoring it to its initial condition and terminating the channel pulse. The instant of time at which the stage 86 starts to conduct is dependent upon the value of signal voltage applied to stage 85 through coupling capacitor 84. The length of each output channel pulse supplied to conductor 49 is therefore essentially a function of the instantaneous value of the input signal voltage.

As best seen in Fig. 6, the resultant modulated channel pulses 48 have their leading edges precisely adjusted in point of time and their lengths modulated in accordance with the input signal to that channel. Each pulse group in the resultant composite wave 87 appearing at the output of the amplifier 50 therefore comprises a synchronizing pulse 22 followed by the length-modulated channel pulses in time division relation. Two consecutive groups are shown in wave 87 of Fig. 6.

The composite signal may be transmitted in any desired manner from the transmitter terminal to the receiver terminal, for example, by means of radio relay links, telephone lines or coaxial cable. At the receiving terminal shown in block form in Fig. 3, the composite multiplex signal 87 is first applied to a waveform generator 90. This generator derives from the received signal all of the waves which are necessary for the detection and separation of the information conveyed by the various channel pulses. The input signal is first amplified and clipped to remove any distortion due to amplitude variations and fading, in the amplifier and clipper 91. The clipped and amplified signal 100 is supplied to a first output conductor 92, and it is also supplied over conductors 88 and 89 to a differentiator 93 and a synchronizing pulse separator 94, respectively. By means of the differentiator 93 and succeeding clipper and amplifier 95, whose operation will shortly be described in greater detail, a train of 300-kc. timing pulses are produced corresponding very accurately to the timing pulses 16 in the transmitter and precisely synchronized with the received synchronizing pulses. In the synchronizing pulse separator 94, the wider synchronizing pulses are separated from the channel pulses by an integration process and utilized to trigger a timing sawtooth generator 97 whose output is amplified in a cathode-coupled amplifier 98. The resultant sawtooth wave 101 is supplied to an output conductor 99.

Figure 3:
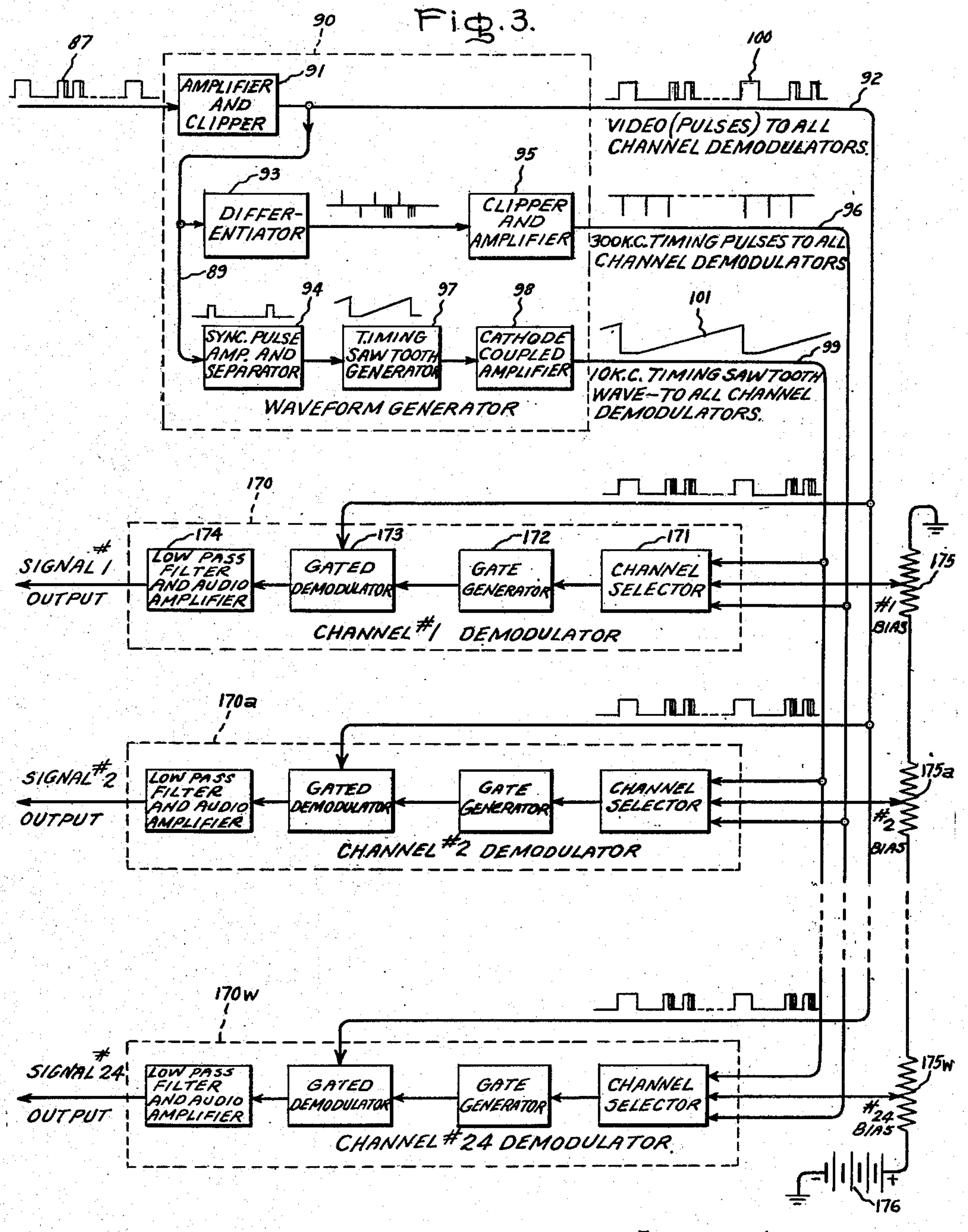
Fig. 3 is a simplified schematic block diagram of a 24-channel pulse multiplex receiver terminal adapted to receive signals from the transmitter of Fig. 1.
Figure 4:
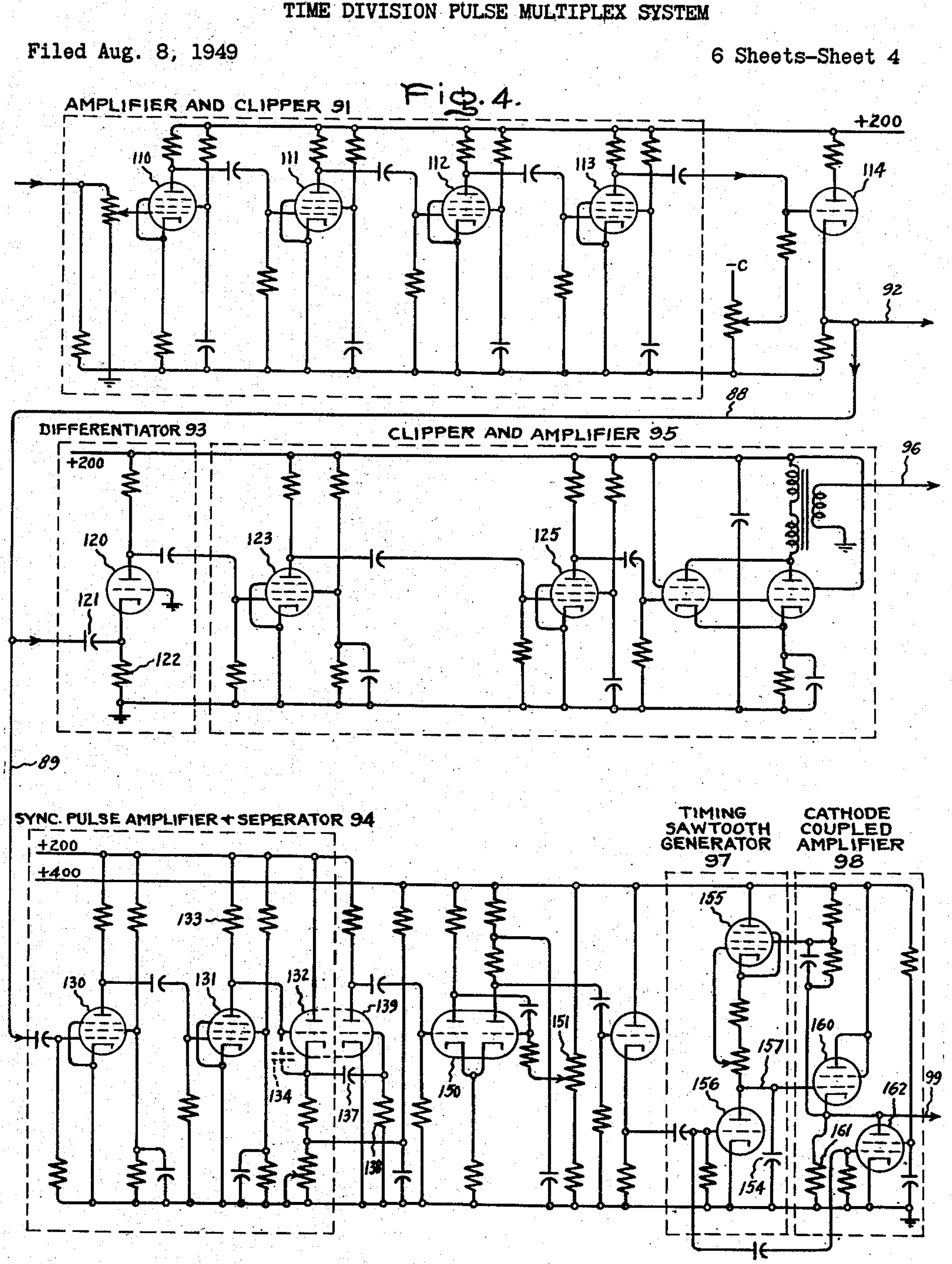
Fig. 4 is a detailed circuit diagram of the waveform generator in the receiver of Fig. 3.

The circuits of the waveform generator 90 in Fig. 3 will now be considered in greater detail in connection with the corresponding circuit diagram of Fig. 4. The amplifier and clipper 91 conventionally comprises an over-driven amplifier having four stages 110, 111, 112 and 113 which alternately clip the positive and negative portions of the input signal to provide a clean rectangular wave. The output wave 100 is supplied through a cathode follower stage 114 to the output conductors 92, 88 and 89.

Figure 7:
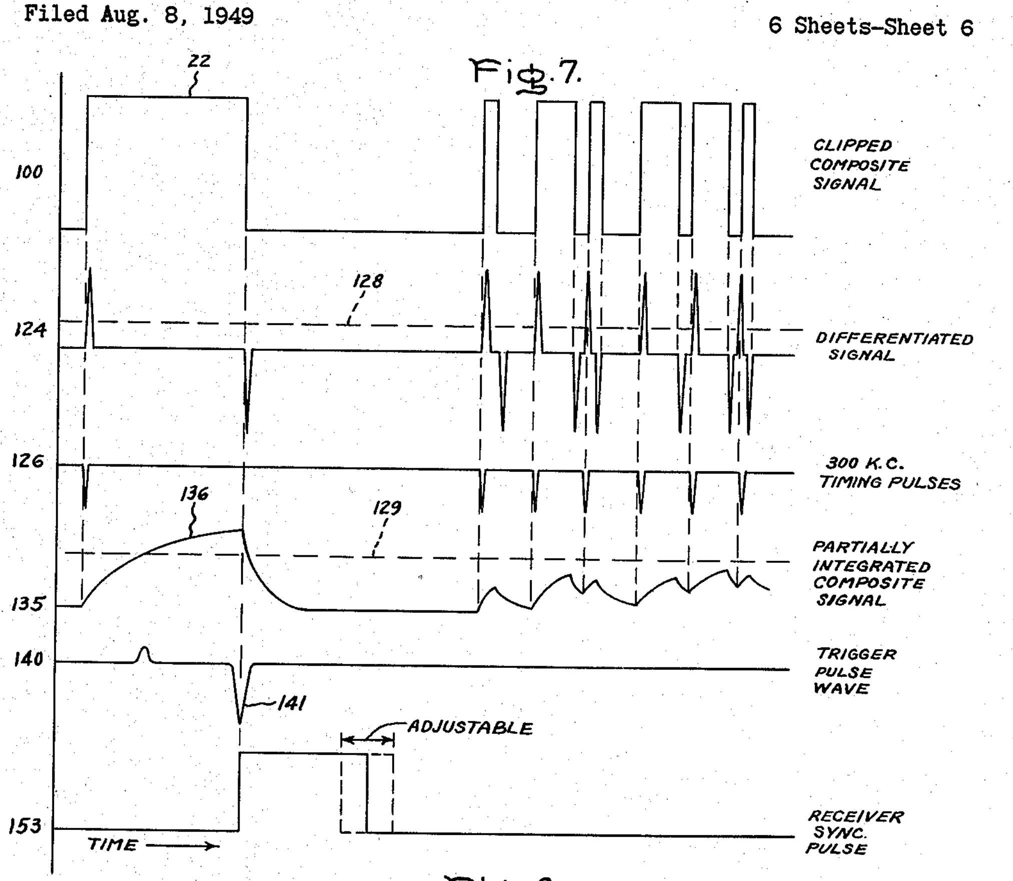
Fig. 7 is another group of curves on a different time scale, illustrating waves developed at several points in the receiver.

The operation of the differentiator 93 and of the clipper and amplifier 95 will be better understood by reference to Fig. 4 in conjunction with the waveforms of Fig. 7. The clipped and amplified composite signal 100 appearing at the output of amplifier 91 is applied to a differentiating network in the cathode return circuit of a grounded grid amplifier 120. This network comprises a capacitor 121 and resistor 122 whose time constant is very short as compared to the duration of any channel pulse. The signal appearing upon the control grid of the amplifier stage 123 therefore appears generally as represented by the wave 124 in Fig. 7, in which a sharp positive peak is produced at the leading edge of each of the positive pulses in the wave 100, and a sharp negative peak at the trailing edge. The amplifier 123 is self-biased to operate as a clipper so that the only portion of the wave 124 which is supplied to the following amplifier stage 125 is that corresponding to the negative peaks above clipping level 128. These in turn cause negative voltage pulses to appear at the anode of amplifier 123, as represented by the wave 126 in Fig. 7, which are utilized as the receiver timing pulses.

It is important to note that, although the individual channel pulses of the wave 100 in Fig. 7 may be of different lengths, so that the negative pulses resulting from differentiation of this wave are irregularly spaced, as represented in the lower half of wave 124, nevertheless the clipped positive pulses derived by differentiating their leading edges are all accurately positioned and may therefore be utilized as timing pulses in the same manner as in the transmitter. This therefore insures that each one of the channel demodulators in the receiver is precisely and automatically synchronized from the same channel pulse which it detects.

The circuits in the lower portion of Fig. 4 are those which generate a 10-kc. sawtooth wave similar to that generated in the transmitter. The synchronizing pulse amplifier and separator 94 comprises three stages 130, 131, 132. The amplified composite signal 100 is partially integrated by means of the long-time-constant network comprising resistor 133 and the inherent grid-to-cathode capacity 134 of the triode 132. The resultant distorted wave is similar to that represented graphically by curve 135 in Fig. 7. It will be noted that the distorted pulse 136 produced by each synchronizing pulse 22 is of substantially greater amplitude than the remaining distorted pulses due to channel pulses because of its substantially greater length, or time duration.

The wave 135 is clipped in the stage 132 to leave only the positive peaks above clipping level 129, and these are then differentiated by means of a short-time-constant coupling network comprising a capacitor 137 and resistor 138. The resultant wave appearing at the anode of the next amplifier stage 139 is therefore generally as represented by the wave 140 in Fig. 7. It will be seen that this wave includes a sharp negative pulse 141 synchronized with the trailing edge of each transmitted synchronizing pulse 22.

The pulses 141 are utilized to form receiver synchronizing pulses for the timing sawtooth generator 97 by utilizing them to trigger a cathode-coupled multivibrator 150. The multivibrator output is a train of positive pulses. as shown by curve 153, each of which has its leading edge synchronized with respect to the trailing edge of a corresponding transmitted pulse. The length of this pulse may be adjusted, by means of a potentiometer 151, so that the sawtooth wave generator may be fully discharged between trains of pulses.

The timing sawtooth generator 97 is represented in Fig. 4 as being of known form in which a sweep capacitor 154 is charged through a constant-current charging network including a pentode amplifier 155. The charging of capacitor 154 is periodically interrupted and it is discharged by means of the synchronizing pulse supplied to a discharge tube 156 in parallel to the sweep capacitor 154. The resultant output sawtooth pulse is then supplied over conductor 157 to a cathode-coupled amplifier 98.

The amplifier 98 is similar in some respects to a conventional cathode follower since it includes amplifier 160 and output cathode load resistance 161. However, it also includes a discharge tube 162 in shunt to resistor 161 which is rendered conductive in synchronism with the discharge tube 156. The primary purpose of the discharge tube 162 is to avoid distortion of the sawtooth wave which is supplied to the highly capacitive load comprising the 24 channel demodulators and connecting cables. It prevents distortion by discharging the load capacity at the end of each sweep of the sawtooth sweep voltage.

Referring now again to the block diagram of Fig. 3, it will be noted that each of the 24 channel demodulators, of which only three demodulators 170, 170$a$ and 170$w$ are shown, has the same circuit arrangement. Thus, each of them comprises a channel selector 171, a gate generator 172, a gated demodulator 173 and a low pass filter and audio amplifier 174. The amplified and clipped video signal 169 is supplied to all the gated demodulators in parallel over conductor 92. Each of the channel selectors is also supplied, in a manner similar to the channel selectors of the transmitter, with the 300-kc. timing pulses, the 10-kc. timing sawtooth wave, and an adjustable bias voltage. As in the case of the transmitter, this bias voltage is supplied from one of the respective sections 175, 175$a$—175$w$ of the potentiometer which is energized from a bias source conventionally represented as a common battery 176.

Figure 5:
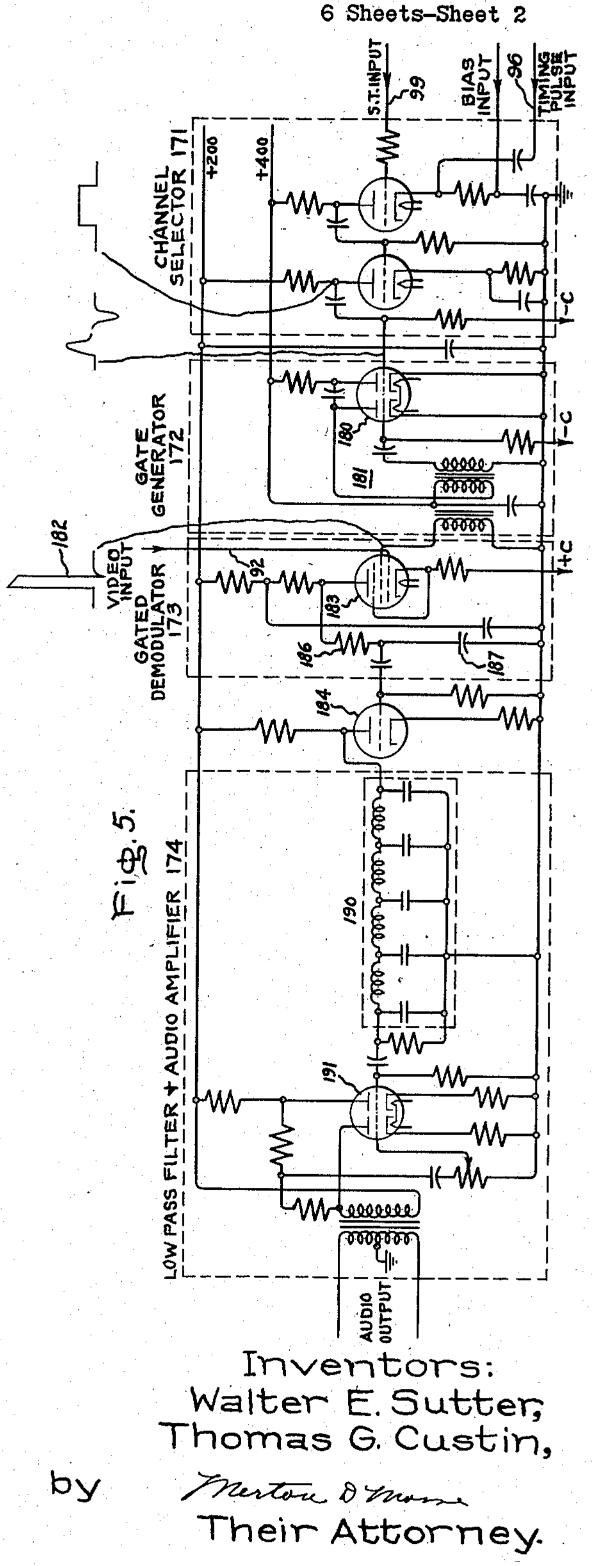
Fig. 5 is a detailed circuit diagram of one of the channel demodulators of the receiver of Fig. 3.

The circuits of a channel demodulator are shown in greater detail in Fig. 5. The construction and operation of the channel selector 171 may be identical to that of the channel selector 43 in the transmitter. The accurately timed trigger pulse at the output of the channel selector, corresponding to the desired channel pulse to be detected, is supplied to the right-hand section of a dual triode 180 in the gate generator 172. This section operates as a driver amplifier for the left-hand section, which is connected in the circuit of a conventional blocking oscillator 181. The output of the blocking oscillator 181 is a relatively narrow rectangular pulse 182 of relatively high voltage (about 100 volts, for example).

The gated demodulator 173 comprises a pentode amplifier 183 having the gate pulses 182 supplied to its screen grid and the composite video signals applied to its control grid. A suitable value of positive cathode bias voltage is impressed so that the tube 183 is normally non-conducting and the length-modulated channel pulses are supplied to an amplifier stage 184 only when they are coincident with the gate pulses 182.

Figure 8:
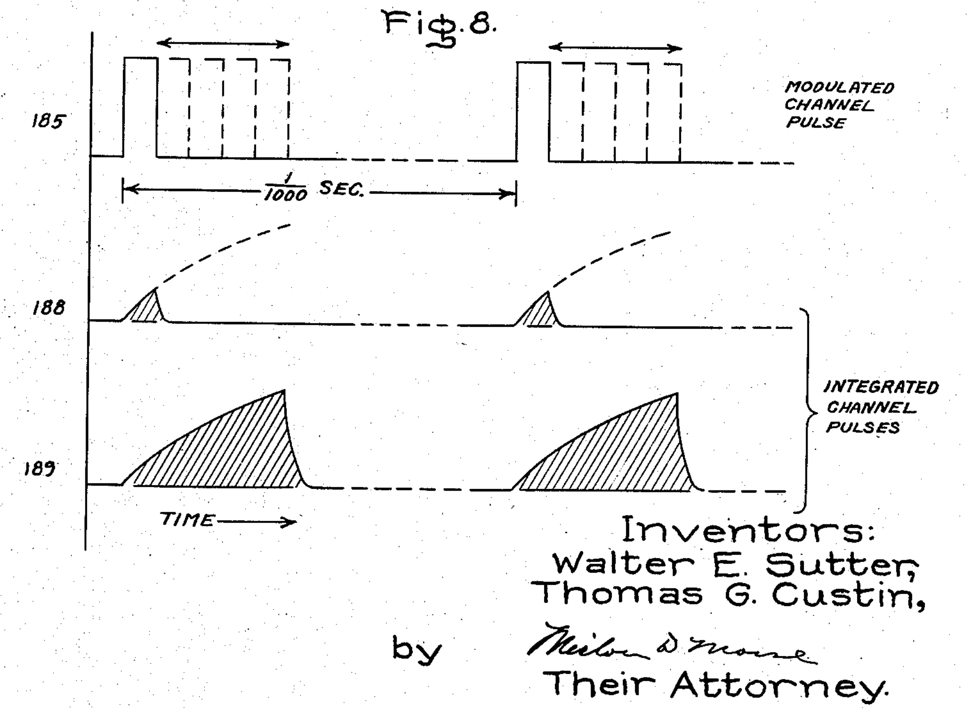
Fig. 8 is a third group of curves, on a still different common time scale, illustrating further electrical characteristics of the receiver circuits.

Thus, a selected train of channel pulses, recurring at the basic 10-kc. rate, is supplied from the output of the amplifier 184. These pulses are generally represented by the curve 185 in Fig. 8 and the approximate limits of their length modulation is indicated generally by the small horizontal arrows.

The pulses 185 are integrated by means of a coupling network comprising resistor 186 and capacitor 187 before being supplied to amplifier 184. This network has a relatively long time constant as compared to the duration of the pulses, so that the peak amplitudes and areas of the resultant pulses are dependent upon the degree of width modulation. Thus, the resultant pulses supplied to amplifier 184 may be generally represented by the waves 188 and 189 in Fig. 8 under conditions of minimum and maximum pulse length, respectively.

The original modulation signal is now recovered in known manner by passing the wave through a low pass filter 190 and amplifying it in a suitable amplifier represented as a two-stage amplifier 191. The filter 190 is represented as a conventional four-section filter having series inductance sections and shunt capacity sections.

From the foregoing description of our invention, it will be seen that we have provided simple and effective means for positively synchronizing all of the circuits of both the transmitter and receiver terminals of a time division pulse multiplex system with respect to the single master oscillator in the transmitter. Each of the individual trains of channel pulses is utilized to generate one of the gate pulses in the receiver. Thus, a relatively large number of channels can be accommodated without interference and cross-talk. While our invention has been illustrated in its application to a 24-channel, high fidelity pulse multiplex system, it will be understood that it is not limited to this precise number of channels or to the precise frequencies mentioned. Actual tests on a system of the type illustrated have amply demonstrated that a high quality audio signal may be transmitted on each channel. For telegraph and facsimile service, where high fidelity is not essential, additional channels may readily be accommodated by known methods of duplexing or by utilizing a lower sampling rate.

While a specific embodiment has been shown and described, it will of course be understood that various modifications may be made without departing from the invention. The appended claims are therefore intended to cover any such modifications within the true spirit and scope of the invention.

What we claim as new and desire to secure by Letters Patent of the United States is:

1. A time division pulse multiplex system comprising a transmitting station including a master oscillation source, means synchronized from said source for producing a group of synchronizing pulses at a desired group frequency, means also synchronized from said source for producing a plurality of groups of channel pulses recurring at said frequency but progressively time-displaced so as to be interleaved with each other and with said synchronizing pulses, means for modulating each of said groups of channel pulses with a desired signal to be multiplexed, and means for combining and transmitting all said pulse groups; and a receiving station including means for deriving a timing wave from said synchronizing pulses, means for deriving individual timing pulses from each of said channel pulses, means conjointly controlled by said timing wave and timing pulses for separately selecting each of said groups of channel pulses, and means for demodulating each of said selected groups to reproduce each of said signals.

2. A time division pulse multiplex system comprising a transmitting station including a master oscillation source, means synchronized from said source for producing a group of synchronizing pulses at a desired group frequency, means also synchronized from said source for producing a plurality of groups of channel pulses recurring at said frequency but progressively time-displaced so as to be interleaved with each other and with said synchronizing pulses, means for modulating the pulse lengths in each of said groups of channel pulses with a desired signal to be multiplexed, and means for combining and transmitting all said pulse groups; and a receiving station including means for deriving a timing wave from said synchronizing pulses, means for deriving individual timing pulses from each of said channel pulses each synchronized with the leading edge thereof, means conjointly controlled by said timing wave and timing pulses for separately selecting each of said groups of channel pulses, and means for demodulating each of said selected groups to reproduce each of said signals.

3. A time division pulse multiplex system comprising a transmitting station including a master oscillation source, means synchronized from said source for generating a train of timing pulses spaced apart by a desired channel spacing, means also synchronized from said source for generating a group of synchronizing pulses having a desired group spacing, means conjointly controlled by said timing and synchronizing pulses for generating a plurality of time-displaced groups of channel pulses, means for individually modulating each of said groups of channel pulses with a desired signal to be multiplexed, and means for combining and transmitting all said pulse groups in time division multiplex relation; and a receiving station including means for deriving a receiver synchronizing wave from said synchronizing pulses, means for deriving individual selector pulses from each of said channel pulses, means conjointly controlled by said synchronizing wave and selector pulses for selecting each of said time-displaced groups of channel pulses, and means for demodulating each of said selected groups to reproduce each of said signals.

4. A time division pulse multiplex system comprising a transmitting station including a master oscillating source, means synchronized from said source for generating a train of timing pulses spaced apart by a desired channel spacing, means also synchronized from said source for generating a group of synchronizing pulses having a desired group spacing, means conjointly controlled by said timing and synchronizing pulses for generating a plurality of time-displaced groups of channel pulses, means for individually modulating the pulse lengths in each of said groups of channel pulses with a desired signal to be multiplexed, and means for combining and transmitting all said pulse groups in time division multiplex relation; and a receiving station including means for deriving a receiver synchronizing wave from said synchronizing pulses, means for deriving individual selector pulses from each of said channel pulses each synchronized with the leading edge of a corresponding received channel pulse, means conjointly controlled by said synchronizing wave and selector pulses for selecting each of said time-displaced groups of channel pulses, and means for demodulating each of said selected groups to reproduce each of said signals.

5. A time division pulse multiplex system comprising a transmitting station including a high frequency master oscillation generator, means synchronized from said generator for producing a train of synchronizing pulses at a submultiple of said frequency, means synchronized from said generator for producing a plurality of channel pulse trains each having said submultiple frequency and progressively time-displaced with respect to said synchronizing pulse train, means for individually modulating length of the channel pulses in each train with respect to one edge thereof in accordance with a signal to be multiplexed, means for combining said trains into periodic pulse groups each having an initial synchronizing pulse followed by one channel pulse from each train; and a receiving station including means for deriving a timing wave from said synchronizing pulses, means for deriving individual timing pulses from said channel pulses each synchronized with said edge of a respective channel pulse, means conjointly controlled by said timing wave and timing pulses for separately selecting each of said channel pulse trains, and means for demodulating each of said selected trains to reproduce each of said signals.

6. A time division pulse multiplex system comprising a transmitting terminal including a high frequency master oscillation generator, means synchronized from said generator for producing a train of synchronizing pulses each of predetermined length and recurring at a submultiple of said frequency, means synchronized from said generator for producing a plurality of channel pulse trains each having said submultiple frequency and progressively time-displaced with respect to said synchronizing pulse train, means for individually modulating the length of the channel pulses in each train with respect to one edge thereof in accordance with a signal to be multiplexed, the maximum length of each said modulated channel pulse being less than said predetermined length, means for combining said trains into periodic pulse groups each having an initial synchronizing pulse followed by one channel pulse from each train; and a receiving terminal including means for integrating said received pulse groups and deriving a timing wave from said synchronizing pulses, means for concurrently differentiating said received pulse groups and deriving individual timing pulses from said channel pulses each synchronized with said edge of a respective channel pulse, pulse selecting means conjointly controlled by said timing wave and timing pulses for separately selecting each of said channel pulse trains, and means for demodulating each of said selected trains to reproduce each of said signals.

7. A time division pulse multiplex system comprising a transmitting station including a master oscillation source, a timing pulse generator synchronized from said source for generating a train of timing pulses spaced apart by a desired channel spacing, a synchronizing pulse generator also synchronized from said source for generating a train of synchronizing pulses having a desired group spacing, a plurality of channel modulators each conjointly controlled by said timing and synchronizing pulses for generating a train of channel pulses at said group frequency, means for independently adjusting the phasing of each modulator to synchronize it with a different timing pulse in each group, means for modulating each of said trains of channel pulses with a desired signal to be multiplexed, and means for combining and transmitting said groups of synchronizing and channel pulses; and a receiving station comprising means for deriving a group synchronizing wave from said synchronizing pulses, means for deriving from said channel pulses a group of selector pulses each individually synchronized with a corresponding channel pulse, a plurality of channel selectors each conjointly controlled by said synchronizing wave and said selector pulses, means for adjusting the phasing of each said selector to select a different channel pulse from each group and a corresponding plurality of demodulators for detecting and translating the signal modulation of each train of selected channel pulses.

8. A time division pulse multiplex system comprising a transmitting station including a master oscillation source, a timing pulse generator synchronized from said source for generating a train of timing pulses spaced apart by a desired channel spacing, a synchronizing pulse generator also synchronized from said source for generating a train of synchronizing pulses having a desired group spacing, a plurality of channel modulators each conjointly controlled by said timing and synchronizing pulses for generating a train of channel pulses at said group frequency, means for independently adjusting the phasing of each modulator to synchronize it with a different timing pulse in each group, means for modulating the pulse lengths in each of said trains of channel pulses with a desired signal to be multiplexed, and means for combining and transmitting said groups of synchronizing and channel pulses; and a receiving station comprising means for deriving a group synchronizing wave from said synchronizing pulses, means for deriving from said channel pulses a group of selector pulses each individually synchronized with the leading edge of a corresponding channel pulse, a plurality of channel selectors each conjointly controlled by said synchronizing wave and said selector pulses, means for adjusting the phasing of each said selector to select a different channel pulse from each group and a corresponding plurality of demodulators for detecting and translating the signal modulation of each train of selected channel pulses.

9. A time division pulse multiplex system comprising a transmitter terminal including a master oscillation generator, means for generating periodic groups of pulses, each group comprising an initial synchronizing pulse followed by a train of spaced channel pulses, the pulses in each group being individually synchronized from said generator, means for modulating the length of each channel pulse with respect to its leading edge in accordance with a signal to be multiplexed; and a receiving terminal including means for deriving from said groups a timing wave having the group frequency, means for differentiating said groups and deriving therefrom a train of timing pulses each individually synchronized with the leading edges of the received channel pulses, a plurality of pulse selecting means each conjointly controlled by said timing wave and said timing pulses for selecting a different modulated channel pulse in each group, and a corresponding plurality of means for demodulating each of said selected pulses to reproduce each of said signals.

10. A time division pulse multiplex system comprising a transmitter terminal including a master oscillation generator, means for generating periodic groups of pulses, each group comprising an initial synchronizing pulse of predetermined length followed by a train of spaced channel pulses, the pulses in each group being individually synchronized from said generator, means for modulating the length of each channel pulse with respect to its leading edge in accordance with a signal to be multiplexed; the maximum length of each said modulated channel pulse being less than said predetermined length; and a receiving terminal including means for integrating said received pulse groups and deriving therefrom a timing wave having the group frequency, means for simultaneously differentiating said received pulse groups and deriving therefrom a train of timing pulses each individually synchronized with the leading edge of a received channel pulse, a plurality of pulse selecting means each conjointly controlled by said timing wave and said timing pulses for selecting a different modulated channel pulse in each group, and a corresponding plurality of signal detecting means for demodulating each of said selected pulses to reproduce each of said signals.

11. A time division pulse multiplex system for producing a composite pulse signal consisting of periodically-recurring pulse groups each comprising an initial synchronizing pulse followed by a plurality of time-spaced, length-modulated, channel pulses, said groups recurring at a frequency higher than the highest modulating frequency, comprising in combination, means for generating a master control wave having a high frequency which is a multiple of said group frequency and equal to a desired frequency of recurrence of said channel pulses, means for converting said wave into short channel timing pulses at said high frequency, frequency dividing means controlled by said wave for developing said synchronizing pulses at said group frequency, a plurality of channel modulators equal to the number of modulating signals to be multiplexed, each said modulator including a pulse generator conjointly controlled by said timing and synchronizing pulses for developing one of said channel pulses, means for adjusting the time positions of said channel pulses so that each occurs in synchronism with a different timing pulse, each said modulator also including means to modulate the length of the channel pulse, a corresponding plurality of sources of modulating signals connected respectively to said last means, and means to combine said synchronizing and modulated channel pulses to form said pulse signal.

12. A time division pulse multiplex system for producing a composite pulse signal consisting of periodically-recurring pulse groups each comprising an initial, synchronizing pulse followed by a plurality of time-spaced, length-modulated channel pulses, said groups recurring at a frequency higher than the highest modulating frequency, comprising in combination, means for generating a master control wave having a high frequency which is a multiple of said group frequency and equal to a desired frequency of recurrence of said channel pulses, means for converting said wave into short channel timing pulses at said high frequency, frequency dividing means controlled by said wave for developing said synchronizing pulses at said group frequency, means controlled by said synchronizing pulses for generating a sawtooth selector wave of said group frequency, a plurality of channel modulators equal to the number of modulating signals to be multiplexed, each said modulator including a channel selector conjointly controlled by said timing pulses and said selector wave for developing a train of channel selector pulses, means comprising a source of adjustable bias potential for each channel selector for adjusting the time positions of said channel selector pulses so that each occurs in synchronism with a different timing pulse, a pulse generator synchronized from each channel selector for generating said channel pulses, each said modulator also including means to modulate the length of said channel pulses, a corresponding plurality of sources of modulating signals connected respectively to said last means, and means to combine said synchronizing and modulated channel pulses to form said pulse signal.

13. A time division pulse multiplex receiver for receiving a composite pulse wave of the type consisting of periodically-recurring pulse groups, each group comprising an initial synchronizing pulse followed by a plurality of time-displaced channel pulses each of which is separately modulated by intelligence-bearing signals, comprising in combination, means for deriving from said synchronizing pulses a control wave synchronized therewith, means for deriving from each of said individual channel pulses a control pulse synchronized therewith, means conjointly controlled by said control wave and control pulses for selecting one predetermined channel pulse from each group, and means for demodulating each of said selected channel pulses to reproduce the modulating signal.

14. A time division pulse multiplex receiver for receiving a composite pulse wave of the type consisting of periodically-recurring pulse groups, each group comprising an initial, relatively long, synchronizing pulse followed by a plurality of substantially shorter time-displaced channel pulses each of which is separately modulated by intelligence-bearing signals, comprising in combination, means for deriving from said synchronizing pulses a sawtooth control wave synchonized therewith, means for deriving from each of said individual channel pulses a control pulse synchronized therewith, means conjointly controlled by said sawtooth wave and said control pulses for selecting one predetermined channel pulse from each group, and means for demodulating each of said selected channel pulses to reproduce the modulating signal.

15. In a time division pulse multiplex system of the type wherein a composite pulse wave consisting of periodically recurring pulse groups is transmitted, each group comprising an initial synchronizing pulse followed by a plurality of spaced channel pulses which are separately length-modulated by modulating signals, each of said synchronizing pulses having substantially greater length than any channel pulse, a receiver for said wave comprising means for integrating said wave and deriving control pulses therefrom synchronized with said synchronizing pulses, means for concurrently differentiating said wave and deriving therefrom groups of timing pulses individually synchronized with the leading edges of said modulated channel pulses, a plurality of channel selectors each conjointly controlled by said control pulses and said timing pulses for selecting one predetermined channel pulse from each group, and means for demodulating each of said selected channel pulses to reproduce each of said signals.

16. A time division pulse multiplex receiver for receiving a composite pulse wave of the type consisting of periodically-recurring pulse groups, each group comprising an initial synchronizing pulse followed by a plurality of time-displaced channel pulses each of which is separately length-modulated by a signal to be detected, and each of said synchronizing pulses having substantially greater length than the maximum length of any channel pulse, comprising in combination, means for integrating said wave and deriving therefrom a control wave having the fundamental group frequency and synchronized with said synchronizing pulses, means for differentiating said composite wave and deriving therefrom a train of control pulses individually synchronized with the leading edge of each pulse therein, a plurality of means each conjointly controlled by said control wave and control pulses for selecting a different channel pulse from each group, and means for demodulating each of the resultant trains of selected channel pulses to reproduce the modulating wave.

17. A time division pulse multiplex receiver for receiving a composite pulse wave of the type consisting of periodically-recurring pulse groups, each group comprising an initial, relatively long, synchronizing pulse followed by a plurality of substantially shorter, time-displaced channel pulses each of which is separately length-modulated by a signal to be detected, comprising in combination, means for integrating and clipping said wave and deriving therefrom a sawtooth control wave which has the fundamental group frequency and is synchronized with said synchronizing pulses, means for concurrently differentiating and clipping said composite wave and deriving therefrom a train of control pulses each individually synchronized with the leading edge of a corresponding pulse therein, a plurality of channel pulse selecting means each conjointly controlled by said control wave and control pulses for selecting a different channel pulse from each group, and means for demodulating each of the resultant trains of selected channel pulses to reproduce the modulating wave.

18. In a time division pulse multiplex system of the type wherein a composite pulse wave consisting of periodically-recurring pulse groups is transmitted, each group comprising an initial rectangular synchronizing pulse followed by a plurality of spaced rectangular channel pulses which are separately length-modulated by modulating signals, each of said synchronizing pulses having substantially greater length than any channel pulse, a receiver for said wave comprising means for integrating said wave and deriving control pulses therefrom each synchronized with one of said synchronizing pulses, means synchronized from said control pulses for generating a sawtooth wave at the group frequency, means for concurrently differentiating said composite wave and deriving therefrom groups of time-displaced timing pulses each individually synchronized with the leading edge of one of said modulated channel pulses, plurality of channel selectors each conjointly controlled by said sawtooth wave and said timing pulses for selecting one predetermined channel pulse from each group, and means for demodulating each of said selected channel pulses to reproduce each of said signals.

19. A time division multiplex receiver for operation with a composite pulse wave of the type consisting of periodically-recurring pulse groups whose group frequency is higher than the highest modulating frequency to be received, each group consisting of an initial rectangular synchronizing pulse followed by a plurality of progressively-displaced rectangular channel pulses each of which is separately length-modulated with respect to its leading edge by a desired signal, and said synchronizing pulse having a length greater than the maximum length of any channel pulse, comprising in combination, means including an integrating network having a time constant longer than each synchronizing pulse for deriving from said wave a first train of group timing pulses synchronized with said received synchronizing pulses, means including a differentiating network having a time constant shorter than any channel pulse for concurrently deriving from said wave a second train of sharp pulses, said second train including pulses of one polarity synchonized with the leading edges of said received channel pulses, means comprising a plurality of channel selectors each conjointly controlled by said group timing pulses and by said pulses of one polarity for selecting one modulated channel pulse from each group, and a corresponding plurality of means for separately demodulating each resultant train of selected channel pulses to reproduce the desired signal.

20. a time division multiplex receiver for operation with a composite pulse wave of the type consisting of periodically-recurring pulse groups, each group consisting of an initial rectangular synchronizing pulse followed by a plurality of progressively - displaced rectangular channel pulses each of which is separately length-modulated with respect to its leading edge by a desired signal, and said synchronizing pulse having a length greater than the maximum length of any channel pulse, comprising in combination, means for supplying said wave through an integrating network having a time constant substantially longer than each synchronizing pulse, means for clipping said composite wave at the output of said network and deriving therefrom a train of group timing pulses synchronized with said synchronizing pulses, means for producing a selector wave having the fundamental group frequency and synchronized with said group timing pulses, means for concurrently supplying said composite wave through a differentiating network having a time constant substantially shorter than the minimum length of any channel pulse, means for clipping said composite wave at the output of said differentiating network and deriving therefrom a train of selector pulses each synchronized with the leading edge of a received channel pulse, means comprising a plurality of channel selectors each conjointly controlled by said selector wave and by said selector pulses for generating train of control pulses, means utilizing each control pulse to select one channel pulse from each group, and means for detecting the desired modulation signal in each train of selected channel pulses.

21. A time division multiplex receiver for operation with a composite pulse wave of the type consisting of periodically-recurring pulse groups whose group frequency is higher than the highest modulating frequency to be received, each group consisting of an initial rectangular synchronizing pulse followed by a plurality of progressively-displaced rectangular channel pulses each of which is separately length-modulated with respect to its leading edge by a desired signal, and said synchronizing pulse having a length greater than the maximum length of any channel pulse, comprising in combination, means for supplying said wave through an integrating network having a time constant substantially longer than each synchronizing pulse, means for clipping said composite wave at the output of said network and deriving therefrom a train of group timing pulses synchronized with said synchronizing pulses, a sawtooth wave generator, means for synchronizing said generator at said group frequency from said group timing pulses, means for concurrently supplying said composite wave through a differentiating network having a time constant substantially shorter than the minimum length of any channel pulse, means for clipping said wave at the output of said differentiating network and deriving therefrom a train of channel selector pulses each synchronized with the leading edge of a received channel pulse, a plurality of channel selectors each normally biased beyond cutoff, means for applying both said sawtooth wave and said channel selector pulses to each said selector in a sense tending to overcome said bias, means for independently adjusting the bias on each selector so it becomes conductive on occurrence of a different selector pulse, means utilizing the output of each selector to form a channel gate pulse, and a corresponding plurality of gated channel demodulators to each of which said composite wave and one of said gate pulses is supplied, said demodulators each selecting one channel pulse from each group and detecting its modulation signal.

WALTER E. SUTTER.
THOMAS G. CUSTIN.

No references cited.